United States Patent
Kraemer

(10) Patent No.: US 11,305,735 B2
(45) Date of Patent: Apr. 19, 2022

(54) WIPER ARM DEVICE

(71) Applicant: Robert Bosch GmbH, Stuttgart (DE)

(72) Inventor: Godelieve Kraemer, Huegelsheim (DE)

(73) Assignee: Robert Bosch GmbH, Stuttgart (DE)

( * ) Notice: Subject to any disclaimer, the term of this patent is extended or adjusted under 35 U.S.C. 154(b) by 5 days.

(21) Appl. No.: 16/956,828

(22) PCT Filed: Oct. 11, 2018

(86) PCT No.: PCT/EP2018/077707
§ 371 (c)(1),
(2) Date: Jun. 22, 2020

(87) PCT Pub. No.: WO2019/120673
PCT Pub. Date: Jun. 27, 2019

(65) Prior Publication Data
US 2020/0398794 A1 Dec. 24, 2020

(30) Foreign Application Priority Data

Dec. 21, 2017 (DE) ...................... 10 2017 223 527.6

(51) Int. Cl.
*B60S 1/34* (2006.01)
*B60S 1/52* (2006.01)
(Continued)

(52) U.S. Cl.
CPC ............. *B60S 1/3415* (2013.01); *B60S 1/524* (2013.01); *B60S 1/3862* (2013.01); *B60S 2001/4054* (2013.01); *B60S 2001/4058* (2013.01)

(58) Field of Classification Search
CPC ...... B60S 1/3415; B60S 1/524; B60S 1/3862; B60S 2001/4054; B60S 2001/4058; B60S 1/522
See application file for complete search history.

(56) References Cited

U.S. PATENT DOCUMENTS

| 4,782,547 A | 11/1988 | Mohnach |
| 5,327,614 A | 7/1994 | Egner-Walter et al. |

(Continued)

FOREIGN PATENT DOCUMENTS

| DE | 4032256 | 4/1992 |
| DE | 102014214109 | 1/2016 |

(Continued)

OTHER PUBLICATIONS

International Search Report for Application No. PCT/EP2018/077707 dated Jan. 9, 2019 (English Translation, 2 pages).

*Primary Examiner* — Andrew A Horton
(74) *Attorney, Agent, or Firm* — Michael Best & Friedrich LLP

(57) ABSTRACT

The invention relates to a wiper arm device, in particular a windscreen wiper arm device, comprising: at least one hose-holding unit (12) which can be mounted on at least one wiper arm (10) and which comprises at least one hose guide (14) provided for guiding at least one washing water hose (16); at least one auxiliary nozzle unit (18); and at least one coupling unit (20) which is provided to couple the auxiliary nozzle unit (18) to the hose-holding unit (12) and comprises at least one first coupling element (22) and at least one corresponding second coupling element (24) for coupling. According to the invention, the first coupling element (22) is formed at least in part by the hose guide (14).

10 Claims, 3 Drawing Sheets

(51) Int. Cl.
 *B60S 1/38* (2006.01)
 *B60S 1/40* (2006.01)

(56) References Cited

U.S. PATENT DOCUMENTS

| | | |
|---|---|---|
| 5,430,909 A | 7/1995 | Edele et al. |
| 5,842,251 A * | 12/1998 | LeFran.cedilla.ois .................... B60S 1/3497 15/250.04 |
| 2003/0009841 A1 | 1/2003 | Sato |
| 2007/0018012 A1 | 1/2007 | Harris et al. |
| 2015/0113754 A1 | 4/2015 | Umeno |
| 2018/0361996 A1 | 12/2018 | Rapp et al. |

FOREIGN PATENT DOCUMENTS

| | | |
|---|---|---|
| DE | 102016213453 | 3/2017 |
| EP | 2813402 | 12/2014 |
| FR | 2547548 | 12/1984 |
| FR | 2758781 | 7/1998 |
| GB | 2121681 | 1/1984 |
| GB | 2331231 | 5/1999 |
| JP | 2013511424 A | 4/2013 |

\* cited by examiner

WIPER ARM DEVICE

BACKGROUND OF THE INVENTION

A wiper arm device having an additional nozzle unit which is arranged on a wiper arm has already been proposed.

SUMMARY OF THE INVENTION

The invention is based on a wiper arm device having at least one hose retention unit which can be arranged on at least one wiper arm and which comprises at least one hose guide which is provided to guide at least one washing water hose, having at least one additional nozzle unit and having at least one coupling unit which is provided to couple the additional nozzle unit to the hose retention unit, and which comprises at least a first coupling element and at least a corresponding second coupling element for coupling.

It is proposed that the first coupling element be formed at least partially by the hose guide.

As a result of the configuration of the wiper arm device according to the invention, a device with improved properties with respect to assembly can advantageously be provided. In a particularly advantageous manner, a coupling of the additional nozzle unit avoiding additional components can be achieved. Furthermore, in particular a capacity for retrofitting or adaptability of existing wiper systems can be improved. In a quite particularly advantageous manner, a windshield wiper can be provided in a particularly flexible manner with any number of additional nozzle units to form a nozzle chain. It is also possible in particular to arrange an additional nozzle unit in any region along the hose retention unit in order to thereby provide specific positions of the wiper with washing water.

A "wiper arm device" is intended in particular to be understood to be a device for a wiper arm and/or a device which at least partially, preferably at least to a large extent, forms a wiper arm. Alternatively, the wiper arm device may also completely form the wiper arm device. The term "provided" is intended to be understood to mean in particular specifically programmed, configured and/or equipped. The fact that an object is provided for a specific function is intended in particular to be understood to mean that the object performs and/or carries out this specific function in at least one application and/or operating state. A "hose retention unit" is intended to be understood in particular to be a unit which is provided to connect a hose in a non-releasable manner, in particular to the wiper arm. Preferably, the washing water hose extends at least partially, preferably at least to a large extent and in a particularly preferred manner completely, parallel with a main extent direction of the hose retention unit and/or a wiper arm. In particular for connection to the wiper arm, the hose retention unit has at least one securing element. Preferably, the wiper arm can be introduced, in particular pushed, therein at least substantially parallel with a main extent direction of the securing element. Alternatively or additionally, the securing element can be clip-fitted onto the wiper arm, in particular locked, and preferably at least substantially perpendicularly to a main extent direction of the wiper arm. The term "at least to a large extent" is intended to be understood to mean in particular at least up to 55%, preferably at least up to 65%, preferably at least up to 75%, in a quite particularly preferred manner at least up to 85% and in a quite particularly preferred manner at least up to 95%. A "main extent direction" of an object is intended to be understood to be in particular a direction which extends parallel with a longest edge of a smallest geometric parallelepiped which still just completely surrounds the object. The term "at least substantially perpendicular" is intended to be understood to be in particular an orientation of a direction relative to a reference direction, wherein the direction and the reference direction, in particular when viewed in a plane, form an angle of 90°, wherein the angle in particular has a maximum deviation of in particular less than 8°, advantageously less than 5° and in a particularly advantageous manner less than 2°. The term "at least substantially parallel" is intended to be understood to be in particular an orientation of a direction relative to a reference direction, wherein the direction and the reference direction, in particular when viewed in a plane, form an angle of 0°, wherein the angle in particular has a maximum deviation of in particular less than 8°, advantageously less than 5° and in a particularly advantageous manner less than 2°. A "washing water hose" is intended to be understood to be in particular a tubular element which is provided to direct washing water. Preferably, the washing water hose is constructed in a flexible and/or resilient manner. The washing water hose is in particular at least partially, preferably at least to a large extent, surrounded by the hose guide. In a particularly preferred manner, the securing element is connected at least partially in an integral manner to the hose guide. An "additional nozzle unit" is in particular intended to be understood to be a nozzle unit which is provided in addition to at least one main nozzle unit. Preferably, the additional nozzle unit is provided to apply washing water to a wiping face in a region of an inner circle and/or an outer circle of a wiper. A "nozzle unit" is in this context intended to be understood to be in particular a unit which comprises at least one nozzle element. Preferably, the nozzle unit comprises at least two nozzle elements. In particular, the additional nozzle unit is constructed as a multi jet nozzle unit. A "multi jet nozzle unit" is intended to be understood to be in particular a nozzle unit which has more than one nozzle element and preferably a large number of nozzle elements. The nozzle elements may in particular be arranged in a row, in particular in the main extent direction of the hose retention unit. Preferably, the nozzle elements are arranged in a fan-like manner. A "nozzle element" is intended to be understood to be in particular an element which is provided to discharge washing water or to spray it in a specific direction. In particular, the nozzle element has at least one nozzle opening which opens a washing water system toward the environment. The nozzle element may be produced from a metal and/or in a particularly advantageous manner from a plastics material. Preferably, the nozzle element is provided to be coupled to the washing water hose. In particular, the additional nozzle unit forms at least partially together with the main nozzle unit and/or other additional nozzle units a nozzle chain. A "coupling unit" is intended to be understood to be in particular a unit which is provided for repeated and in particular tool-free coupling of at least two separate components. In particular, the coupling unit is provided for non-positive-locking and/or positive-locking coupling. The term "connected in a non-positive-locking and/or positive-locking manner" is intended to be understood to be in particular a releasable connection, wherein a retention force between two components is transmitted preferably by means of a geometric engagement of the components in each other and/or a friction force between the components. In particular, at least the first coupling element is at least partially, preferably at least to a large extent and in a particularly preferred manner completely formed from a flexible material. Alternatively or additionally, the coupling unit may also be provided for materially engaging connection. The term "connected in a materially engaging manner" is intended to be understood to mean in particular that the mass components are held together by means of atomic or molecular forces, such as, for example, in the case of soldering, welding, adhesive-bonding and/or vulcanization. In particular, the hose guide forms at least to a large extent and in a particularly preferred manner completely the first coupling element. In a quite particularly preferred manner, the first coupling element is identical to the hose guide.

It is further proposed that the additional nozzle unit have at least one hose connector for connection of the additional nozzle unit to a washing water hose which at least partially forms the second coupling element. It is thereby possible to dispense with additional components for forming the coupling unit. In particular, an assembly can thus be further simplified. In particular, at least an outer wall of the hose connection is constructed to correspond to an inner wall of the hose guide. The hose connector forms in particular at least to a large extent and in a particularly preferred manner completely the second coupling element. In a quite particularly preferred manner, the second coupling element is identical to the hose connector. The hose connector is in particular provided for technical fluid connection of the additional nozzle unit. The hose connector comprises in particular at least one in particular conical hose connection piece. Preferably, the hose connector has at least two in particular mutually opposed hose connection pieces, which are in particular at least substantially identical to each other. In particular, "at least substantially identical" is preferably intended to be understood to be identical with the exception of production and/or assembly tolerances. The hose connector is in particular provided for non-positive-locking and/or positive-locking connection of the washing water hose to the additional nozzle unit. In particular, using two hose connection pieces, it is possible to arrange a plurality of additional nozzle units which are connected in series in particular in the region of the inner circle.

It is further proposed that in a coupled state at least the first coupling element at least partially and preferably at least to a large extent engage around at least the second coupling element. A non-releasable securing of the coupling can thereby be improved. In particular, the first coupling element engages around the second coupling element at least through a peripheral angle of more than 180°, preferably more than 200°, in a particularly preferred manner more than 220° and in a quite particularly preferred manner more than 240°. Preferably, the first coupling element has at least a C-shaped cross-section.

In addition, it is proposed that for coupling the first coupling element and the second coupling element be able to be inserted one inside the other in a main extent direction of the hose retention unit. Assembly can thereby be further simplified. Furthermore, any desired positioning of the additional nozzle unit along the hose retention unit can advantageously be carried out. In particular, the second coupling element can be at least partially inserted into the first coupling element.

It is further proposed that for coupling the first coupling element and the second coupling element be able to be pressed one inside the other transversely relative to a main extent direction of the hose retention unit. Assembly can thereby be further simplified. In particular, the second coupling element can be clip-fitted into the first coupling element. In a particularly advantageous manner, the first coupling element and the second coupling element can be locked to each other.

It is further proposed that the wiper arm device comprise at least one rotation prevention unit which has at least one rotation prevention element which is provided to prevent a rotation of the additional nozzle unit relative to the hose retention unit. It is thereby possible to prevent the additional nozzle unit from discharging washing water in a direction which is not intended as a result of rotation. Advantageously, operational reliability can be improved. In a particularly preferred manner, it is proposed that the rotation securing element be provided to be supported on a wiper arm rod. In particular, the rotation prevention element has at least one in particular L-shaped end portion, which is supported in an assembled state on the wiper arm.

In addition, it is proposed that the first coupling element be able to be arranged in a rotationally secure manner in the rotation prevention element. Stability of the rotation prevention can thereby be improved. Advantageously, operational reliability can be further improved. In particular, the rotation prevention element and the second coupling element together form a coupling receiving member in which the first coupling element can be arranged in a non-positive-locking and/or positive-locking manner.

In order to achieve a particularly compact and preferably stable construction type, it is proposed that the rotation prevention unit be connected at least partially in an integral manner to the coupling unit. In particular, the rotation prevention element is connected in an integral manner to the second coupling element.

It is further proposed that the hose retention unit have at least one securing element, in particular the securing element mentioned above, which is provided to secure the hose retention unit to the wiper arm and which is integrally connected to the hose guide. In particular, the securing element has an at least C-shaped cross-section.

Furthermore, a method for assembling the wiper arm device is proposed, wherein in at least one method step with at least the coupling unit the additional nozzle unit is coupled to the hose retention unit by means of at least the first coupling element and at least the corresponding second coupling element, wherein the first coupling element is at least partially formed by a hose guide of the hose retention unit.

The wiper arm device according to the invention is not intended in this instance to be limited to the above-described application and embodiment. In particular, the wiper arm device according to the invention in order to perform an operating method which is described herein may have a number of individual elements, components and units and method steps different from the number mentioned herein. In addition, in the value ranges set out in this disclosure values which are also within the limits mentioned should also be considered to be disclosed and freely usable.

BRIEF DESCRIPTION OF THE DRAWINGS

Other advantages will be appreciated from the following description of the drawings. An embodiment of the invention is illustrated in the drawings. The drawings, the description and the claims contain a number of features in combination. The person skilled in the art will advantageously also consider the features individually and combine them to form other advantageous combinations.

In the drawings.

DETAILED DESCRIPTION

Figure 1:
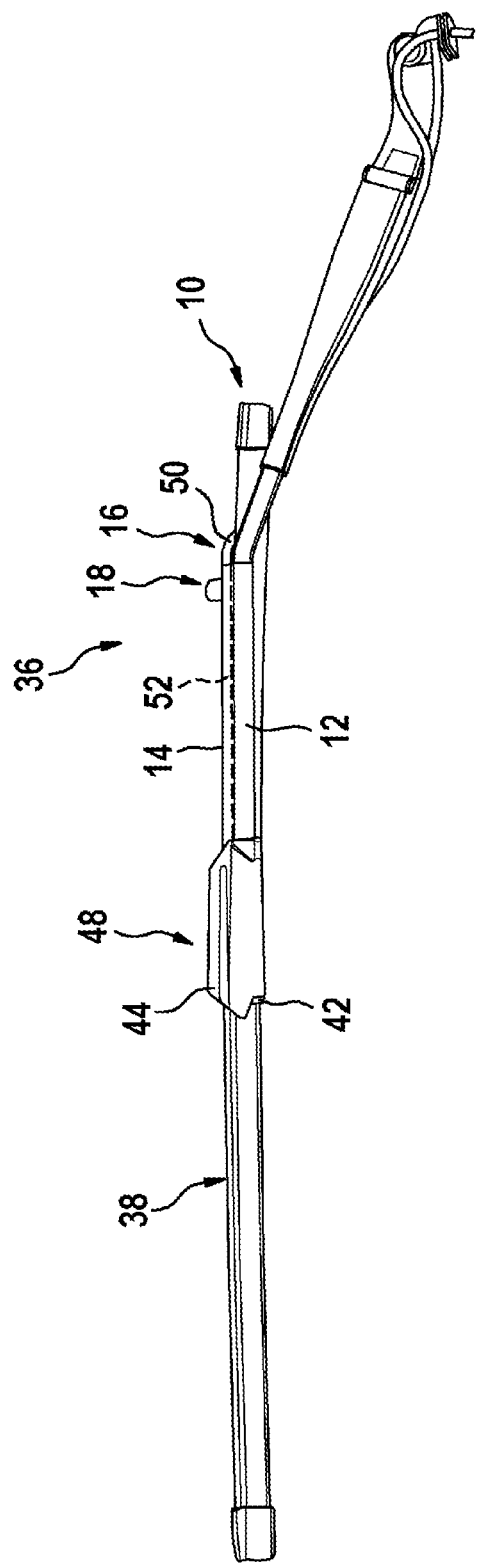
FIG. 1 is a schematic plan view of a wiper having a wiper arm device.

FIG. 1 is a schematic plan view of a wiper 36 which is constructed by way of example as a windshield wiper. In this instance, the wiper 36 is constructed as a vehicle windshield wiper, in particular as a motor vehicle windshield wiper. The wiper 36 is illustrated in an assembled state. The wiper 36 is at least in a cleaning operating mode provided to clean moisture and/or dirt off a wiping face. In this instance, the wiping face is constructed as a pane, in particular a vehicle pane. In principle, it is also conceivable for a pane to be constructed as a window pane.

Furthermore, the wiper 36 has a wiper arm 10. The wiper arm 10 has a main extent direction. In an assembled state of the wiper arm 10, a main extent direction of the wiper arm 10 is at least substantially parallel with a cleaning face.

The wiper 36 comprises a wiper blade 38. The wiper blade 38 forms in the assembled state a positive-locking connection with the wiping face. The wiper blade 38 has a main extent. The main extent of the wiper blade 38 is at least substantially parallel with the wiping face. Furthermore, the main extent of the wiper blade 38 is at least substantially parallel with a main extent of the wiper arm 10. The wiper blade 38 is at least in the cleaning operating state provided to remove moisture and/or dirt from the wiping face.

Furthermore, the wiper 36 comprises a wiper blade adapter 42. The wiper blade adapter 42 has a contact region with respect to the wiper blade 38. The wiper blade adapter 42 is provided for connection of the wiper bade 38 to the wiper arm 10.

The wiper 36 has at least one main nozzle unit 48. The main nozzle unit 48 is provided to apply washing water to the wiping face. The main nozzle unit 48 is provided to discharge washing water in a central region of the wiper blade 38. The main nozzle unit 48 is arranged in the region of the wiper blade adapter 42. The main nozzle unit 48 has at least one nozzle element (not illustrated). In this instance, the main nozzle unit 48 is constructed as a multi jet nozzle unit which comprises a plurality of nozzle elements. In this instance, the nozzle elements may be arranged in a row. In this instance, the nozzle elements are arranged in a fan-like manner.

The wiper arm device comprises a washing water hose 16. The washing water hose 16 is provided to supply at least the main nozzle unit 48 with washing water. The washing water hose 16 is connected in technical fluid terms to a washing water store. The washing water hose 16 is displaced along the wiper arm 10. The washing water hose 16 extends substantially parallel with the main extent direction of the wiper arm 10.

The washing water hose 16 is in this instance constructed in at least two pieces. The washing water hose 16 comprises at least a first washing water hose portion 50. Furthermore, the washing water hose 16 comprises at least a second washing water hose portion 52. Alternatively, the washing water hose 16 could have a plurality of washing water hose portions and in particular in accordance with a number of nozzle units which are intended to be supplied with washing water.

The first washing water hose portion 50 is connected in technical fluid terms to the washing water store. The second washing water hose portion 52 is connected to the first washing water hose portion 50 in technical fluid terms. The second washing water hose portion 52 is at least indirectly connected to the first washing water hose portion 50. The second washing water hose portion 52 is connected in technical fluid terms to the main nozzle unit 48. The second washing water hose portion 52 is directly connected to the main nozzle unit 48.

The wiper 36 has a wiper arm device. In this instance, the wiper arm device is constructed as a windshield wiper arm device and in particular as a vehicle windshield wiper arm device and preferably as a motor vehicle windshield wiper arm device.

The wiper arm device comprises a wiper arm adapter 44. The wiper arm adapter 44 is provided for releasable connection of the wiper blade 38 to the wiper arm 10. The wiper arm adapter 44 is provided to releasably connect the wiper arm 10 to the wiper blade adapter 42. The wiper arm adapter 44 is provided to releasably connect the wiper arm 10 to the wiper blade 38 by means of the wiper blade adapter 42. The wiper blade adapter 42 is provided to releasably connect the wiper blade 38 to the wiper arm 10 by means of the wiper arm adapter 44. The wiper arm adapter 44 is in this instance constructed in one piece. Alternatively, a wiper arm adapter could be constructed in several pieces. Furthermore, a wiper arm adapter could be provided for permanent connection of a wiper blade to a wiper arm.

The wiper arm device comprises a hose retention unit 12. The hose retention unit 12 is provided to arrange the washing water hose 16 on the wiper arm 10. The hose retention unit 12 secures the washing water hose 16 to the wiper arm 10 in a non-releasable manner. In an arranged state of the washing water hose 16, the hose 16 extends at least partially parallel with a main extent direction of the hose retention unit 12.

The hose retention unit 12 has a consistent profile in this instance over an entire longitudinal extent of the hose retention unit 12. The hose retention unit 12 is provided to be secured, in particular clip-fitted, to the wiper arm 10 during assembly. In this instance, the hose retention unit 12 is constructed in an integral manner. Furthermore, the hose retention unit 12 is constructed of at least partially from a flexible material. The hose retention unit 12 comprises at least partially a plastics material. The hose retention unit 12 is constructed as an injection-molded and/or extruded component. It is further conceivable for a hose retention unit to be able to be constructed integrally with a wiper arm adapter. Alternatively, a hose retention unit may be constructed in several pieces.

The hose retention unit 12 has at least one securing element 34. The securing element 34 is provided for securing to the wiper arm 10. The securing element 34 is provided to releasably secure the hose retention unit 12 to the wiper arm 10. The securing element 34 is provided to engage around the wiper arm 10 at least to a large extent. In this instance, the securing element 34 is placed on, in particular clip-fitted to, the wiper arm 10 during assembly. Alternatively, a securing element could be provided for permanently securing a fluid directing unit to a wiper arm. Furthermore, a securing element could be pushed onto a wiper arm during assembly.

The securing element 34 has a consistent profile along an entire main extent of the securing element 34. The securing element 34 has at least a U-shaped profile. In this instance, the securing element 34 has at least a C-shaped profile.

Alternatively, a hose retention unit could have a plurality of securing elements. Furthermore, a securing element could have a consistent profile only over a portion of a longitudinal extent of the securing element. In addition, a securing element could have an O-shaped profile.

The hose retention unit 12 comprises a hose guide 14. The hose guide 14 is provided to guide the washing water hose 16. The washing water hose 16 is in particular at least partially, preferably at least to a large extent, surrounded by the hose guide 14. The hose guide 14 is connected in an integral manner to the securing element 34. A main extent direction of the hose guide 14 is arranged parallel with a main extent direction of the securing element 34. The hose guide 14 is constructed in a flexible manner. The hose guide 14 has a consistent profile along an entire main extent. The hose guide 14 has a C-shaped profile. In the assembled state, the hose guide 14 is arranged at a side of the securing element 34 facing away from the wiper arm 10. In the assembled state, the hose guide 14 is arranged at a lee side of the securing element 34. In the assembled state, when viewed in profile, the hose guide 14 is arranged at an end of the securing element 34. Alternatively, a hose retention unit 12 could have a plurality of hose guides. Furthermore, a hose guide in an assembled state could be arranged at a side of a securing element facing a wiper arm. In addition, a hose guide in an assembled state could be arranged at a wind side of a securing element. Furthermore, a hose guide could be arranged on a center portion of a securing element.

Furthermore, the wiper arm device has at least one additional nozzle unit 18. The additional nozzle unit 18 is provided to apply washing water to the wiping face. The additional nozzle unit 18 is provided in addition to the main nozzle unit 48 to apply washing water to the wiping face. The additional nozzle unit 18 is provided to apply washing water in the region of an inner circle of the wiper blade 38. The additional nozzle unit 18 is arranged in the region of an inner circle of the wiper blade 38. Alternatively, the additional nozzle unit could also be arranged at another position, such as, for example, in the region of an outer circle of the wiper blade. Furthermore, the wiper arm device could have additional nozzle units.

The additional nozzle unit 18 is constructed in an integral manner. The additional nozzle unit 18 comprises at least partially a flexible material. Furthermore, the additional nozzle unit 18 comprises at least partially a plastics material. The additional nozzle unit 18 is constructed as an injection-molded component. Alternatively, an additional nozzle unit could be constructed as a 3D printed component.

The additional nozzle unit 18 has at least one nozzle element 54. In this instance, the additional nozzle unit 18 has a plurality of nozzle elements 54. For reasons of clarity, only one of the nozzle elements 54 is provided with a reference numeral. The additional nozzle unit 18 is constructed as a multiple-jet nozzle unit. The nozzle elements 54 could be arranged in a row. In this instance, the nozzle elements 54 are arranged in a fan-like manner. The additional nozzle unit 18 has at least one nozzle retention member 62. At least the nozzle element 54 is arranged inside the nozzle retention member 62. In this instance, all the nozzle elements 54 of the additional nozzle unit 18 are arranged in the nozzle retention member 62.

The additional nozzle unit 18 and the main nozzle unit 48 together form at least partially a nozzle chain. In this instance, the additional nozzle unit 18 and the main nozzle unit 18 completely form a nozzle chain. The additional nozzle unit 18 and the main nozzle unit 18 are connected in series. The washing water hose 16 connects the additional nozzle unit 18 and the main nozzle unit 48 in series. Furthermore, the wiper arm device could have other additional nozzle units, which are also connected in series and which at least partially form a nozzle chain.

The additional nozzle unit 18 has for connection to the washing water hose 16 at least one hose connector 26. The hose connector 26 is provided for non-positive-locking and/or positive-locking connection of the washing water hose 16 to the additional nozzle unit 18. The hose connector 26 comprises at least a first hose connection piece 56. The first hose connection piece 56 is constructed in a conical manner. The washing water hose 16 can be pushed into the first hose connection piece 56 during assembly. In this instance, the hose connector 26 has a second hose connection piece 58. The additional hose connection piece 58 is constructed in a substantially identical manner to the first hose connection piece 56. The second hose connection piece 58 is opposite the first hose connection piece 56. During assembly, the second washing water hose portion 52 can be pushed onto the second hose connection piece 58. In an assembled state, the first hose connection piece 56 is connected to the first washing water hose portion 50 in technical fluid terms, in particular directly. In an assembled state, the second hose connection piece 58 is connected to the second washing water hose portion 52 in technical fluid terms, in particular directly. The hose connector 26 is connected to additional components of the additional nozzle unit 18 at least partially in an integral manner. The hose connector 26 is connected to the nozzle retention member 62 in an integral manner.

Furthermore, the hose connector 26 comprises a connection channel 60. The connection channel 60 connects the first hose connection piece 56 to the second hose connection piece 58 in technical fluid terms. Furthermore, the connection channel 60 connects the first hose connection piece 56 at least to the nozzle element 54 in technical fluid terms. Furthermore, the connection channel 60 connects the second hose connection piece 58 at least to the nozzle element 54 in technical fluid terms. Furthermore, the connection channel 60 connects the nozzle elements 54 to each other in technical fluid terms. The connection channel 60 is constructed in a tubular manner.

For assembly, the additional nozzle unit 18 has at least one handle 64. The handle 64 is connected integrally to additional components of the additional nozzle unit 18. The handle 64 is connected to the hose connector 26 in an integral manner. Furthermore, the handle 64 is connected to the nozzle retention member 62 in an integral manner. The handle 64 has a gripping face 66. The handle 64 is connected to the hose connector 26 in an integral manner. Furthermore, the handle 64 is connected to the nozzle retention member 62 in an integral manner. Alternatively or additionally, an additional nozzle unit 18 may comprise a spoiler, in particular in place of the handle 64. It is conceivable for a handle 64 and a spoiler to be formed by an identical component.

Furthermore, the additional nozzle unit 18 has at least one support element 68. The support element 68 supports the additional nozzle unit 18 on the wiper arm 10. The support element 68 has to this end an L-shaped end portion. The support element 68 is connected in an integral manner to additional components of the additional nozzle unit 18. The support element 68 is in particular connected to the hose connector 26 in an integral manner. The support element 68 is connected to the nozzle retention member 62 in an integral manner.

The wiper arm device comprises at least one coupling unit 20. The coupling unit 20 is provided to couple the hose retention unit 12 to the additional nozzle unit 18 at least in a non-positive-locking and/or positive-locking manner. The coupling unit 20 is provided for tool-free coupling.

The coupling unit 20 has at least a first coupling element 22. The first coupling element 22 is constructed integrally with the hose retention unit 12. The first coupling element 22 is at least partially formed by the hose guide 14. In this instance, the first coupling element 22 is formed completely by the hose guide 14. The first coupling element 22 is identical to the hose guide 14.

The coupling unit 20 has at least a second coupling element 24. The second coupling element 24 is constructed to correspond to the first coupling element 22. The second coupling element 24 is constructed integrally with the additional nozzle unit 18. The second coupling element 24 is constructed at least partially by the hose connector 26. In this instance, the second coupling element 24 is formed completely by the hose connector 26. The second coupling element 24 is identical to the hose connector 26.

In a coupled state, the first coupling element 22 and at least the second coupling element 24 engage at least partially round each other. In this instance, the first coupling element 22 engages around the second coupling element 24. The first coupling element 22 engages around the second coupling element 24 at least through a peripheral angle of more than 180°. In this instance, the first coupling element 22 engages around the second coupling element 24 even through a peripheral angle of more than 240°.

The first coupling element 22 and the second coupling element 24 can be inserted one in the other. The first coupling element 22 and the second coupling element 24 can be inserted one in the other in a main extent direction of the hose retention unit 12. In this instance, the second coupling element 24 can be inserted into the first coupling element 22.

Alternatively or additionally, the first coupling element 22 and the second coupling element 24 can be pressed into each other. In this instance, the first coupling element 22 and the second coupling element 24 can be pressed into each other as a result of the flexible configuration of the first coupling element 22. Furthermore, in this instance the second coupling element 24 can be pressed into the first coupling element 22.

The first coupling element 22 and the second coupling element 24 can be locked to each other. In this instance, the second coupling element 24 can be locked in the first coupling element 22.

Furthermore, the wiper arm device has at least one rotation prevention unit 30. The rotation prevention unit 30 comprises at least one rotation prevention element 32. In a coupled state of the additional nozzle unit 18 and the hose retention unit 12, the rotation prevention element 32 prevents them from rotating relative to each other. The rotation prevention element 32 prevents rotation of the hose retention unit 12 and the additional nozzle unit 18 about a rotation axis, which extends at least substantially parallel with a main extent of the hose guide 14.

It is further proposed that the rotation prevention element 32 be provided to be supported on the wiper arm 10. In particular, the rotation prevention element 32 has at least one, in particular L-shaped end portion, which in an assembled state is supported on the wiper arm 10. In this instance, the rotation prevention element 32 is at least partially formed by the support element 68. The rotation prevention element 32 has a U-shaped profile. The profile of the rotation prevention element 32 is constructed to correspond to a shape of the first coupling element 22. In a coupled state, the first coupling element 22 is secured against rotation by means of a positive-locking connection to the rotation prevention element 32. The rotation prevention element 30 is at least partially connected to the coupling unit 20 in an integral manner. The rotation prevention element 32 is connected to the second coupling element 24 in an integral manner.

Figure 5:
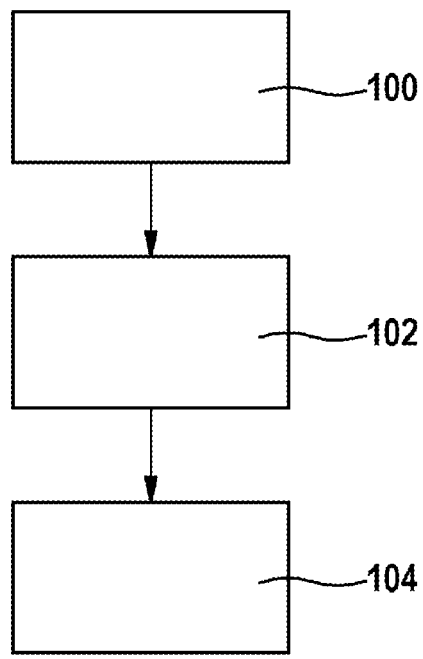
FIG. 5 is a schematic flow chart of a method for assembling the wiper arm device.

FIG. 5 shows a schematic flow chart of a method for assembling the wiper arm device. An equivalent method for disassembly of the wiper arm device could be able to be carried out in the reverse order of the method steps of the method for assembly.

Figure 2:
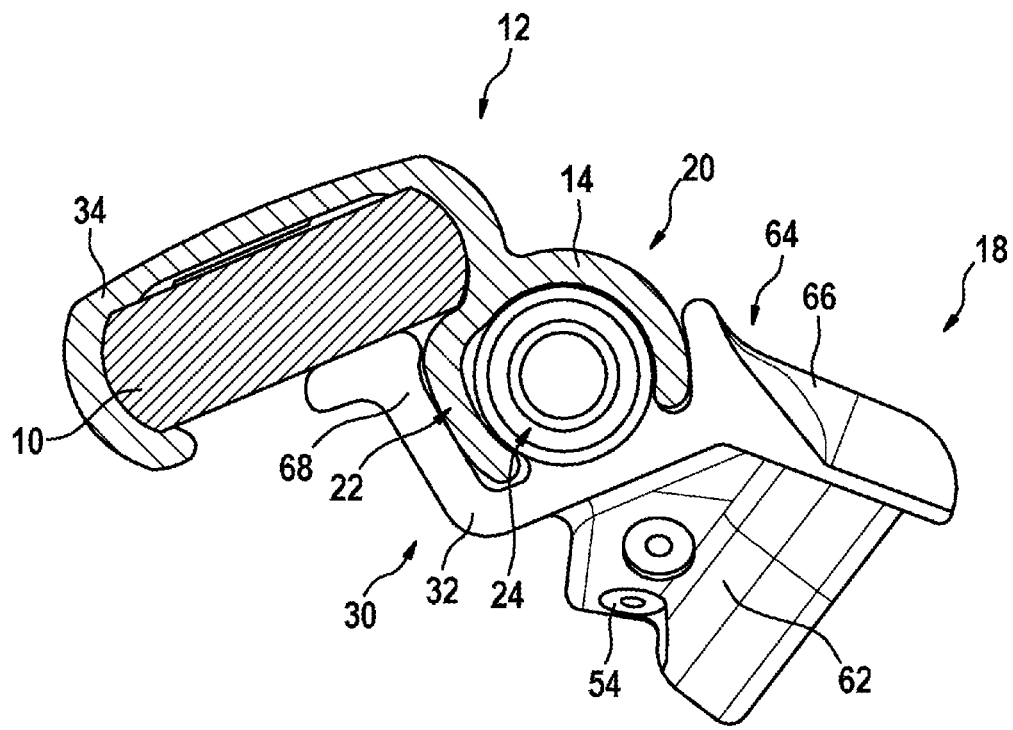
FIG. 2 is a sectioned view of a portion of the wiper arm device with an additional nozzle unit.
Figure 3:
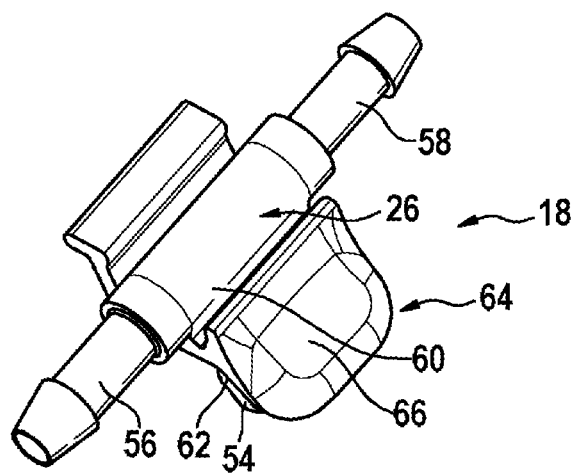
FIG. 3 is a perspective illustration of the additional nozzle unit.

The method comprises a method step 100. In the method step 100, the hose retention unit 12 is secured to the wiper arm 10. The hose retention unit 12 is secured by means of the securing element 34. The securing element 34 is clip-fitted and/or pushed onto the wiper arm 10 (cf. FIG. 2).

The method involves at least one additional method step 102. In the additional method step 102, the additional nozzle unit 18 is coupled to the hose retention unit 12. The first coupling element 22 and the second coupling element 24 are pushed into each other and/or clip-fitted to each other (cf. FIG. 2).

Figure 4:
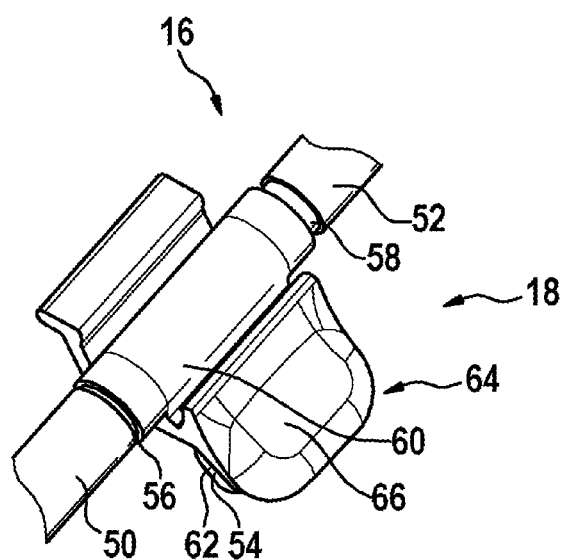
FIG. 4 is a perspective illustration of the additional nozzle unit with a mounted washing water hose.

The method comprises at least one additional method step 104. In the additional method step 104, the washing water hose 6 is connected to the additional nozzle unit 18. The washing water hose 16 is connected to the hose connector 26. The first washing water hose portion 50 is connected to the first hose connection piece 56. The first washing water hose portion 50 is pushed onto the first hose connection piece 56. The second washing water hose portion 52 is connected to the second hose connection piece 58. The second washing water hose portion 52 is pushed onto the second hose connection piece 58 (cf. FIG. 4).

The invention claimed is:

1. A wiper arm device having at least one hose retention unit (12) which is configured to be arranged on at least one wiper arm (10) and which comprises at least one hose guide (14) configured to guide at least one washing water hose (16), the wiper arm device having at least one additional nozzle unit (18) and at least one coupling unit (20) which is configured to couple the additional nozzle unit (18) to the hose retention unit (12), wherein the coupling unit (20) comprises at least a first coupling element (22) and at least a corresponding second coupling element (24) for coupling, and wherein the first coupling element (22) is formed at least partially by the hose guide (14), wherein the wiper arm device further includes at least one rotation prevention unit (30) which has at least one rotation prevention element (32) configured to prevent a rotation of the additional nozzle unit (18) relative to the hose retention unit (12), wherein in a coupled state, the first coupling element (22) is arranged in a rotationally secure manner in the rotation prevention element (32).

2. The wiper arm device as claimed in claim 1, characterized in that the additional nozzle unit (18) has at least one hose connector (26) which at least partially forms the second coupling element (24).

3. The wiper arm device as claimed in claim 1, characterized in that in a coupled state at least the first coupling element (22) and at least the second coupling element (24) at least partially engage around each other.

4. The wiper arm device as claimed in claim 1, characterized in that for coupling, the first coupling element (22) and the second coupling element (24) are configured to be displaced with respect to each other in a main extent direction of the hose retention unit (12).

5. The wiper arm device as claimed in claim 1, characterized in that for coupling, the first coupling element (22) and the second coupling element (24) are configured to be pressed one inside the other transversely relative to a main extent direction of the hose retention unit (12).

6. The wiper arm device as claimed in claim 1, characterized in that the rotation prevention element (32) is supported on the wiper arm (10) in a coupled state of the coupling unit (20).

7. The wiper arm device as claimed in claim 1, characterized in that the rotation prevention unit (30) is connected at least partially in an integral manner to the coupling unit (20).

8. The wiper arm device as claimed in claim 1, characterized in that the hose retention unit (12) has at least one securing element (34) which is configured to secure the hose retention unit (12) to the wiper arm (10), and which is integrally connected to the hose guide (14).

9. A windshield wiper, having at least one wiper arm device as claimed in claim 1.

10. A method for assembling a wiper arm device as claimed in claim 1, characterized in that in at least one method step (102) with the at least one coupling unit (20) the additional nozzle unit (18) is coupled to the hose retention unit (12) by means of the at least a first coupling element (22) and the at least a corresponding second coupling element (24), wherein the first coupling element (22) is at least partially formed by the hose guide (14) of the hose retention unit (12).

\* \* \* \* \*